US012510158B2

(12) United States Patent
Orsi et al.

(10) Patent No.: US 12,510,158 B2
(45) Date of Patent: Dec. 30, 2025

(54) STUFFING BOX FOR USE WITH RECIPROCAL MOVEABLE PISTON RODS AND METHOD OF MANUFACTURING

(71) Applicant: NUOVO PIGNONE TECNOLOGIE S.R.L, Florence (IT)

(72) Inventors: Gianni Orsi, Florence (IT); Alberto Babbini, Florence (IT); Aigbedion Akwara, Florence (IT); Federico Sorgona', Florence (IT); Stephen J. Waymeyer, West Chester, OH (US)

(73) Assignee: Nuovo Pignone Tecnologie S.R.L., Florence (IT)

( * ) Notice: Subject to any disclaimer, the term of this patent is extended or adjusted under 35 U.S.C. 154(b) by 0 days.

(21) Appl. No.: 18/820,392

(22) Filed: Aug. 30, 2024

(65) Prior Publication Data

US 2024/0418264 A1 Dec. 19, 2024

Related U.S. Application Data

(60) Division of application No. 17/319,530, filed on May 13, 2021, now Pat. No. 12,092,216, and a
(Continued)

(30) Foreign Application Priority Data

Nov. 16, 2018 (IT) .................. 102018000010391

(51) Int. Cl.
*F16J 15/16* (2006.01)
*B33Y 80/00* (2015.01)
(Continued)

(52) U.S. Cl.
CPC ........... *F16J 15/162* (2013.01); *F16J 15/182* (2013.01); *F16J 15/26* (2013.01); *B33Y 10/00* (2014.12); *B33Y 80/00* (2014.12)

(58) Field of Classification Search
CPC .......... F16J 15/162; F16J 15/182; F16J 15/26; Y10S 277/93; F04B 53/02; F04B 53/08; F04B 53/164; B33Y 80/00; B33Y 10/00
See application file for complete search history.

(56) References Cited

U.S. PATENT DOCUMENTS 1,859,378 A * 5/1932 Buerger ................ F16J 15/182
  277/930
2,223,519 A * 12/1940 Hornschuch .......... F16J 15/183
  277/516
(Continued)

FOREIGN PATENT DOCUMENTS

CN      87203181 U    11/1987
CN     203098201 U     7/2013
(Continued)

*Primary Examiner* — Nicholas L Foster
(74) *Attorney, Agent, or Firm* — Paul Frank + Collins P.C.

(57) ABSTRACT

Described herein is a packing box for mounting on a machinery shaft. In accordance with one aspect, the packing box housing defines a central opening for insertion of a movable machinery shaft with a hollow passageway surrounding the central opening to form a path for the flow of a fluid coolant. The passageway is provided with a fluid inlet port and a fluid outlet port opening onto the outer surface of the packing box housing, and it is formed by a single conduit or by a plurality of conduits obtained through additive manufacturing process and connected in series or in parallel to wound around the central opening.

20 Claims, 6 Drawing Sheets

Related U.S. Application Data continuation of application No. PCT/EP2019/025398, filed on Nov. 18, 2019.

(51) Int. Cl.
*F16J 15/18* (2006.01)
*F16J 15/26* (2006.01)
*B33Y 10/00* (2015.01)

(56) References Cited

U.S. PATENT DOCUMENTS

| | | | | |
|---|---|---|---|---|
| 2,405,236 A * | 8/1946 | Rhoades | | H05B 7/12 |
| | | | | 373/95 |
| 2,910,007 A * | 10/1959 | Buri | | F04B 53/162 |
| | | | | 92/144 |
| 3,147,982 A * | 9/1964 | Klein | | F16J 15/162 |
| | | | | 277/930 |
| 5,873,575 A * | 2/1999 | Hanlon | | F16J 15/162 |
| | | | | 277/517 |
| 6,932,351 B1 * | 8/2005 | Mowll | | F04B 39/0022 |
| | | | | 277/517 |
| 10,100,729 B2 * | 10/2018 | Simpson | | F02C 6/08 |
| 10,563,766 B2 * | 2/2020 | Maggi | | F04B 39/0292 |
| 11,441,448 B2 * | 9/2022 | Siw | | F01D 11/001 |
| 11,858,192 B2 * | 1/2024 | Tieben | | B29C 48/40 |
| 12,042,973 B2 * | 7/2024 | Tieben | | B29C 48/85 |
| 2015/0035392 A1 | 2/2015 | Pal | | |
| 2016/0208694 A1 * | 7/2016 | Simpson | | F04B 53/08 |
| 2016/0325214 A1 * | 11/2016 | Davis | | F16J 15/324 |
| 2018/0010691 A1 * | 1/2018 | Maggi | | F04B 53/143 |
| 2019/0063609 A1 * | 2/2019 | Marchione | | F16J 15/162 |
| 2021/0254502 A1 * | 8/2021 | Siw | | B33Y 10/00 |
| 2021/0277956 A1 * | 9/2021 | Monahan | | F16J 15/189 |
| 2022/0288831 A1 * | 9/2022 | Tieben | | B29C 48/85 |
| 2022/0355528 A1 * | 11/2022 | Tieben | | B29C 48/397 |
| 2024/0133374 A1 * | 4/2024 | Martin | | F04B 39/0022 |
| 2024/0151222 A1 * | 5/2024 | Krumm | | F04B 39/0022 |
| 2024/0159229 A1 * | 5/2024 | Lagler | | F04B 49/00 |

FOREIGN PATENT DOCUMENTS

| | | |
|---|---|---|
| CN | 206770160 U | 12/2017 |
| CN | 206889220 U | 1/2018 |
| GB | 1301309 | 12/1972 |

* cited by examiner

STUFFING BOX FOR USE WITH RECIPROCAL MOVEABLE PISTON RODS AND METHOD OF MANUFACTURING

CROSS-REFERENCE TO RELATED APPLICATIONS

This application is a divisional of U.S. Ser. No. 17/319,530, filed on May 13, 2021, and entitled "STUFFING BOX FOR USE WITH RECIPROCAL MOVEABLE PISTON RODS AND METHOD OF MANUFACTURING," which is a continuation of International Patent Application No. PCT/EP2019/025398, filed on Nov. 18, 2019, and entitled "STUFFING BOX FOR USE WITH RECIPROCAL MOVEABLE PISTON RODS AND METHOD OF MANUFACTURING," which claims the benefit of priority to Italian Patent Application No. 102018000010391, filed on Nov. 16, 2018. The content of these applications is incorporated herein by reference in its entirety.

FIELD OF THE INVENTION

Embodiments of the subject matter disclosed herein relate to stuffing or packing box members and, more particularly, to improvements in the coolant circulation structure of such members.

BACKGROUND OF THE INVENTION

Packing case structures, also called stuffing or packing boxes, have long been used to provide a seal along and around a reciprocally movable piston rod of a gas compressor to prevent the escape of gas from the piston cylinder along and around the surface of the piston rod. Such packing case structures have also been used to provide gas tight seals along and around the movable shafts of rotating machinery. Typically, a packing case member or packing cup of known type is cylindrically shaped and contains a central circular opening for stationary mounting in a compressor housing on a reciprocally movable piston rod. The central opening is of somewhat greater diameter than that of the piston rod so that the peripheral defining wall of central opening is spaced from the surface of the piston rod so that the latter does not rub against the cup as the piston rod reciprocates in the central opening. But since this spacing can allow gases being compressed by the piston to escape from the compression chamber along and around the surface of the rod, the series of cups making up the packing case contains seal rings which slidably bear against the rod to provide a gas tight barrier.

The seal rings cause sliding friction to occur along the piston rod as the latter reciprocates through the former, which friction causes heating of the packing cups, piston rod and sealing elements themselves. While a liquid lubricant is typically introduced through a passageway in the packing case to the surface of the piston rod to reduce such sliding friction, enough friction usually remains to cause serious heating of the packing cups.

To deal with this problem, the cylindrically shaped cups are typically made in two mating cylindrically shaped pieces. A circular groove is machined into opposing surface portions of the mating faces of the pieces so that, when they are joined, a circular passageway is formed in the cup housing which extends around a majority peripheral portion of the central opening. One end of the passageway contains an inlet port which opens onto one flat face of the cup, while the opposite end portion of the passageway contains an outlet port which opens onto an opposite flat face of the cup. A fluid coolant introduced into the circular passageway flows between the inlet and outlet ports to absorb heat from the cup housing.

Machining is a complex and delicate process. To avoid such a process, U.S. Pat. No. 5,873,575 teaches to provide cooling circuits into each ring forming the packing box through drilling and connect serially such circuits. This, however, limits shape and functionality of the cooling circuit. Furthermore plugs are needed to seal the cooling circuit thus giving problems of potential leakages.

Therefore there is a need for a packing box providing a seal along and around a reciprocally movable piston rod connecting two turbine components or the movable shafts of rotating machinery which is lighter and easier to manipulate with respect to its machined counterpart, allows to optimize the cooling circuit without requiring additional plugs, improves the heat exchange between the metal forming the box and the cooling fluid and thus heat transfer efficiency.

BRIEF DESCRIPTION OF THE INVENTION

According to first exemplary embodiments, a packing box for mounting on a machinery shaft is described. The packing box comprises a housing defining a central opening for hosting a movable machinery shaft, and a hollow passageway surrounding said central opening to form a path for the flow of a fluid coolant between a fluid inlet port and a fluid outlet port. The passageway is formed by a single conduit or a plurality of conduits connected in series or in parallel so as to substantially wound around the circular opening. The single conduit or the plurality of conduits are obtained through a process of additive manufacturing.

In an embodiment the passageway for the coolant fluid forms a cooling circuit comprising curved sections winding, for example helically, around the circular opening and straight sections connecting the curved sections among them and/or with the inlet/outlet ports. Consecutive curved sections are connected together serially while the first and the last curved sections of the series are connected to straight sections in fluid communication, respectively, with the inlet and the outlet ports or vice-versa.

In an advantageous embodiment also the lubricating circuit is constructed through additive manufacturing process.

The packing box may comprise separate packing rings as in conventional solutions or integral packing rings forming a single-piece device. In the former case plugs or o-rings are used for connecting the cooling circuits of each packing ring to avoid coolant leakage while in the latter case no plugs or o-rings are necessary thus obtaining a very advantageous configuration.

The usage of additive manufacturing process allows to design cooling and lubricating circuits having any type of geometry thus bringing high efficiency in lubrication and cooling.

According to further exemplary embodiments, a method is disclosed for the manufacturing of a stuffing box, the method comprising growing through additive manufacturing processing a plurality of packing cups having a central opening for insertion of a movable machinery shaft therein, and one or more cooling conduits around the central opening and enclosed in the packing cups. The conduits surround a majority peripheral portion of the central opening to form a path for the flow of a fluid coolant substantially completely around said circular opening between a fluid inlet port and a fluid outlet port. Also one or more lubricating conduits may be grown along the central opening to form a path for the flow of a lubricating fluid between a lubricating inlet and outlet port.

BRIEF DESCRIPTION OF THE DRAWINGS

The present disclosure will become more apparent from the following description of exemplary embodiments to be considered in conjunction with accompanying drawings wherein.

The following description of exemplary embodiments refer to the accompanying drawings. The same reference numbers in different drawings identify the same or similar elements. The following detailed description does not limit the invention. Instead, the scope of the invention is defined by the appended claims.

DETAILED DESCRIPTION OF THE INVENTION

A stuffing box or packing box is an assembly which is used to prevent leakage of fluid between sliding or turning parts of machine elements. For instance stuffing boxes are employed to provide a seal along and around a reciprocally movable piston rod of a gas compressor to prevent the escape of gas from the piston cylinder along and around the surface of the piston rod. The structure of a stuffing box is complicated because of the need of circulating lubricant and coolant fluids, thus the traditional machining processes required to manufacture a stuffing box can be complex, delicate and represent a limitation to the topologies that can be made. Therefore, embodiments described herein provide a packing box with a seal along and around a reciprocally movable piston rod connecting two turbine components or the movable shafts of rotating machinery which is lighter and easier to manipulate with respect to its machined counterpart, allows to optimize the cooling circuit without requiring additional plugs, improves the heat exchange between the metal forming the box and the cooling fluid and thus improves the heat transfer efficiency.

Figure 1:
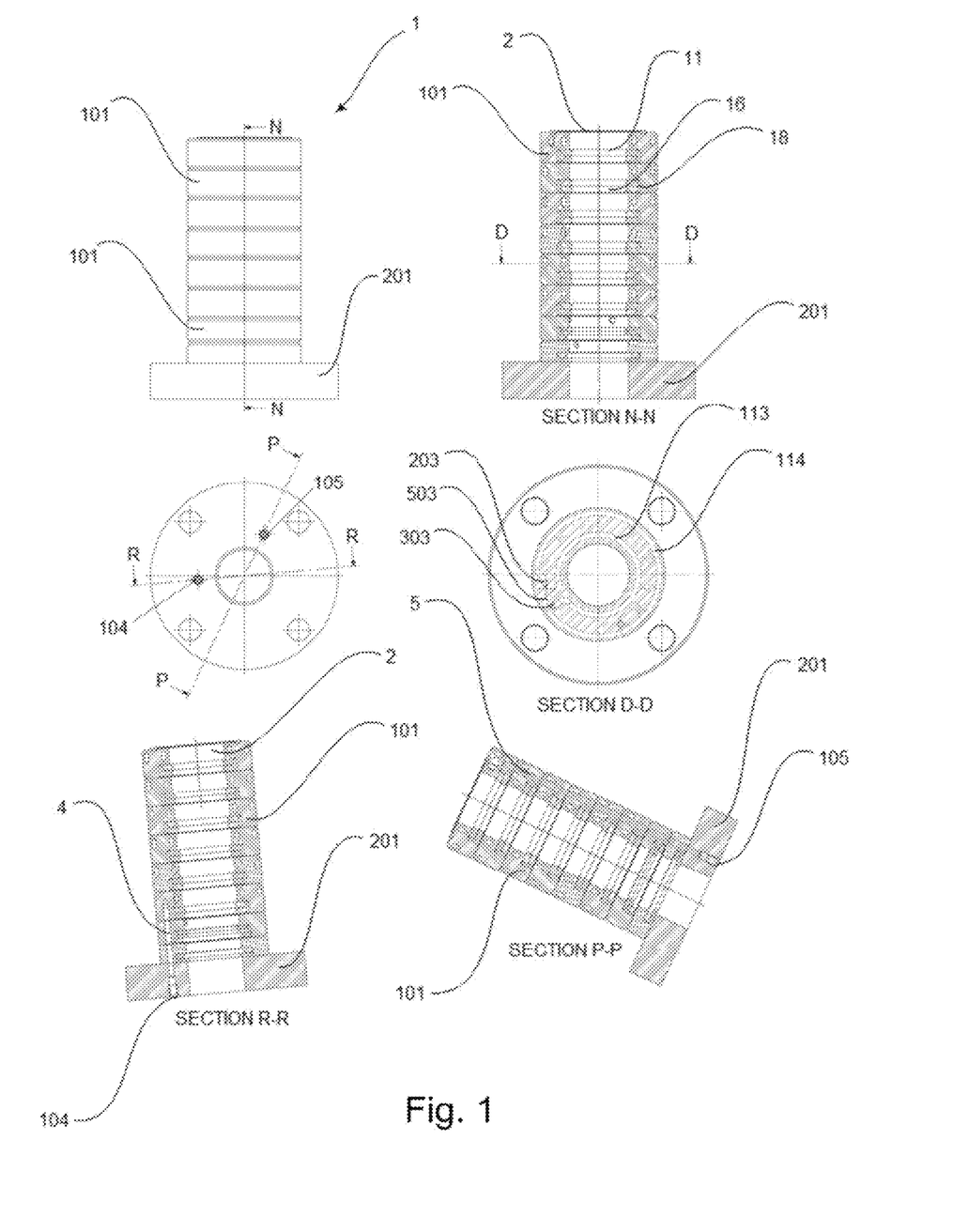
FIG. 1 shows cross section views of a stuffing box according to a first embodiment.

In FIG. 1 a schematic representation of a cross sectional view of an assembled stuffing box 1 according to a first embodiment is shown.

The stuffing box 1, hereinafter also referred as packing case assembly, includes a series of packing cups 101 (eight in the specific configuration shown in the figure) and a flange 201. The number of packing cups 101 contained in any given packing case 1 is obviously a matter of conventional design choice and can go from 2 to 20.

Each of the cups 101 can be constructed of steel, cast iron, bronze, composite or other suitable materials with attention being paid to chemical resistance and mechanical strength requirements for a particular application. The cup 101 of the present example includes a disc or annularly shaped housing 11 and contains a circular central opening 2 which permits it to be loosely and concentrically mounted on a movable machinery shaft, such as either a rotating shaft or a reciprocally movable piston rod of a reciprocating compressor. The diameter of the opening 2 should be sufficiently greater than that of the shaft so that the periphery of the opening is spaced from and does not rub against the shaft as the latter rotates or reciprocates in or through the opening as the case may be.

An annularly extending notch 16 of L-shaped cross-section is formed in and around a surface portion of one end of the cup 101 in which a conventional seal ring 18 is placed. The seal ring 18 thus rubs against the rod or shaft as the latter moves and forms a seal to prevent gases from escaping along the rod or shaft through the spaced apart opening 2 of the cup 101. Typically, the seal ring 18 can be constructed from a wide variety of different materials such as, for example, bronze, cast iron, or various plastics, composites and metal alloys. A passageway 7 may extend through the body of the housing to provide a path for lubricating fluid to lubricate the surface of the rod or shaft against which the seal ring 18 bears. Such a lubricating passageway forms a path for the flow of a fluid lubricant between a lubricant inlet port and a lubricant outlet port, which lubricant inlet port and outlet port open onto at least one outer surface of said housing.

Figure 6:
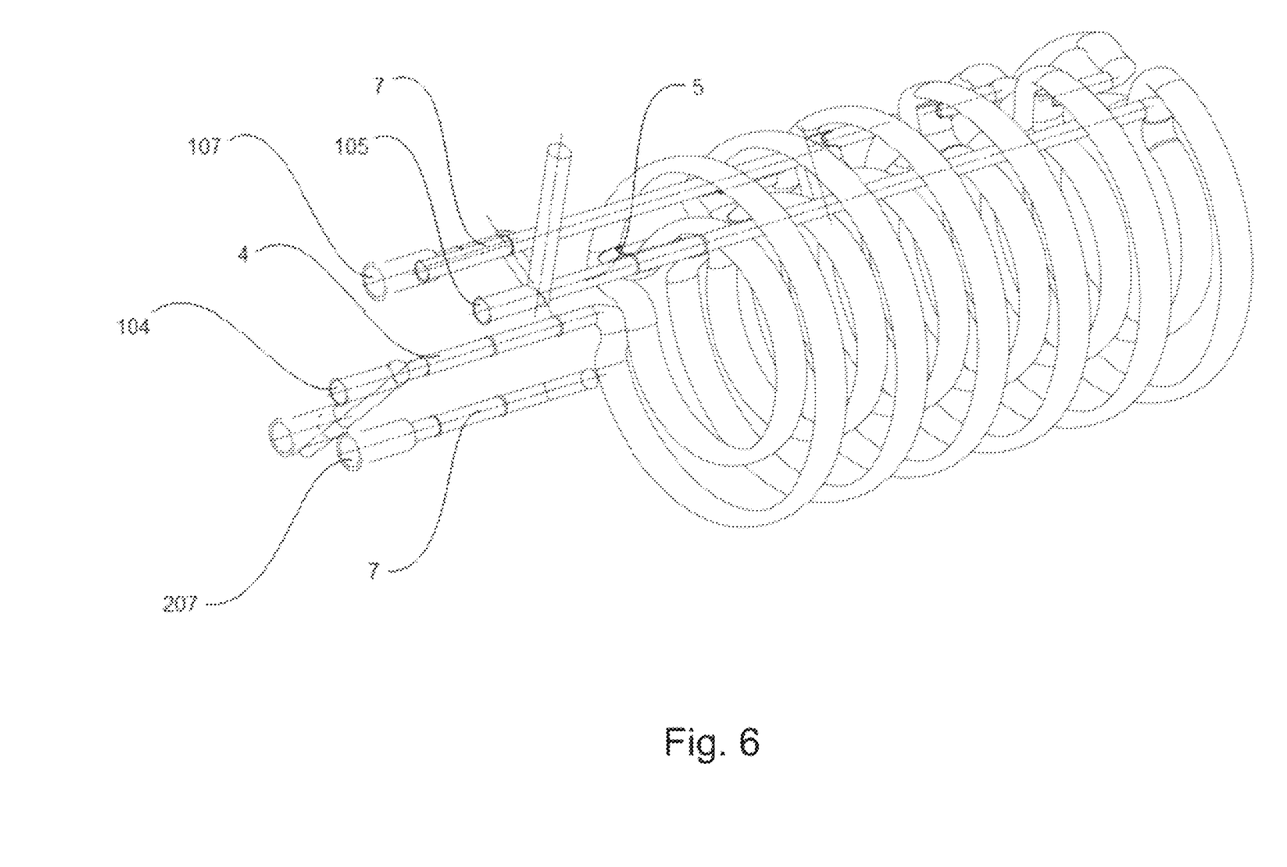
FIG. 6 shows a tridimensional view of the cooling circuit of FIG. 2 with additional lubricating circuit according to embodiments herein.

The lubricating passageway can take the form of a hole in the packing assembly or of a conduit. In the configuration shown in FIG. 6, the lubricating passageway 7 is formed by a single conduit or a plurality of conduits connected in series so as to substantially run alongside the central opening 2 of the packing box 1.

Figure 2:
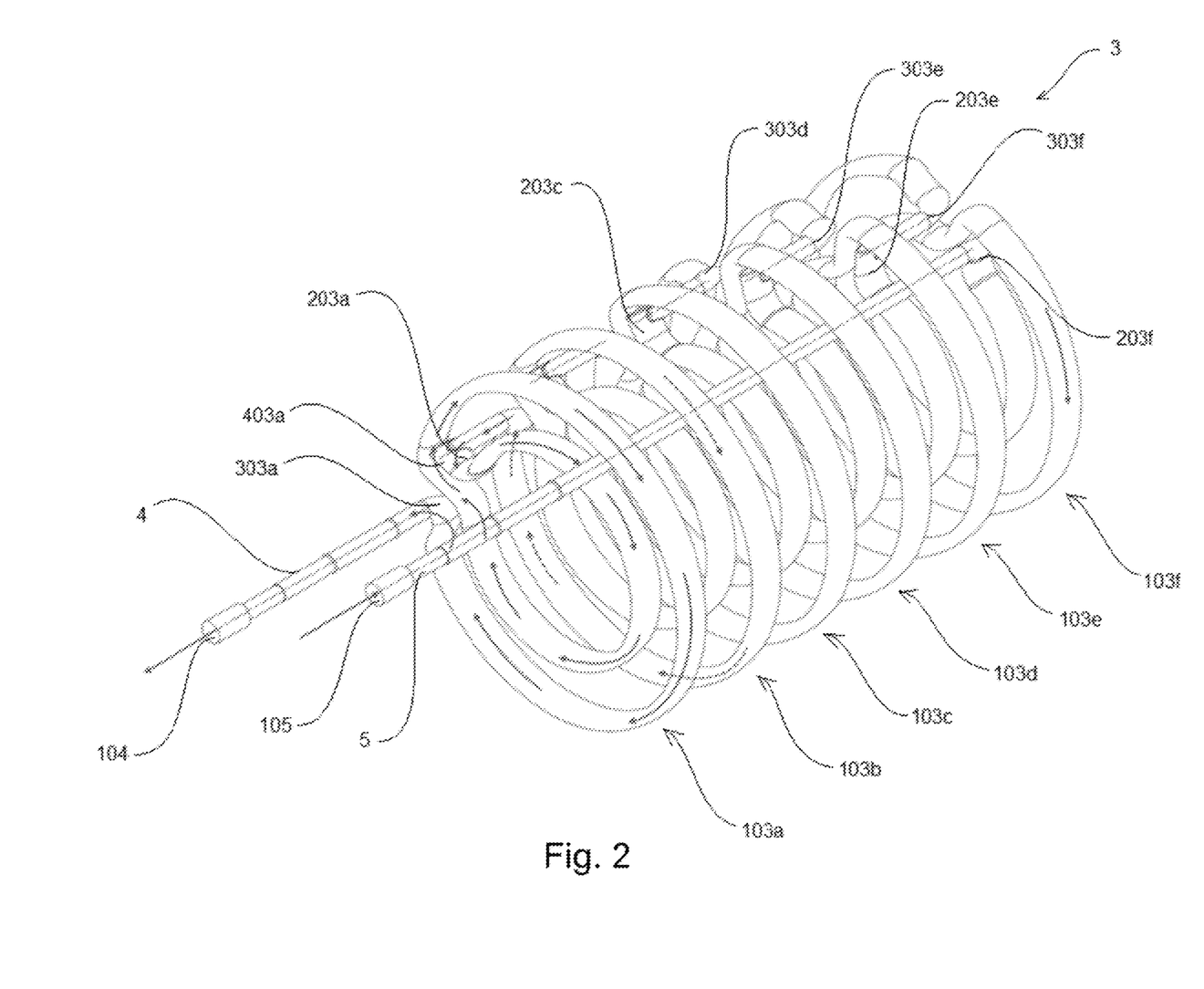
FIG. 2 shows a tridimensional view of a cooling circuit according to embodiments herein.
Figure 3:
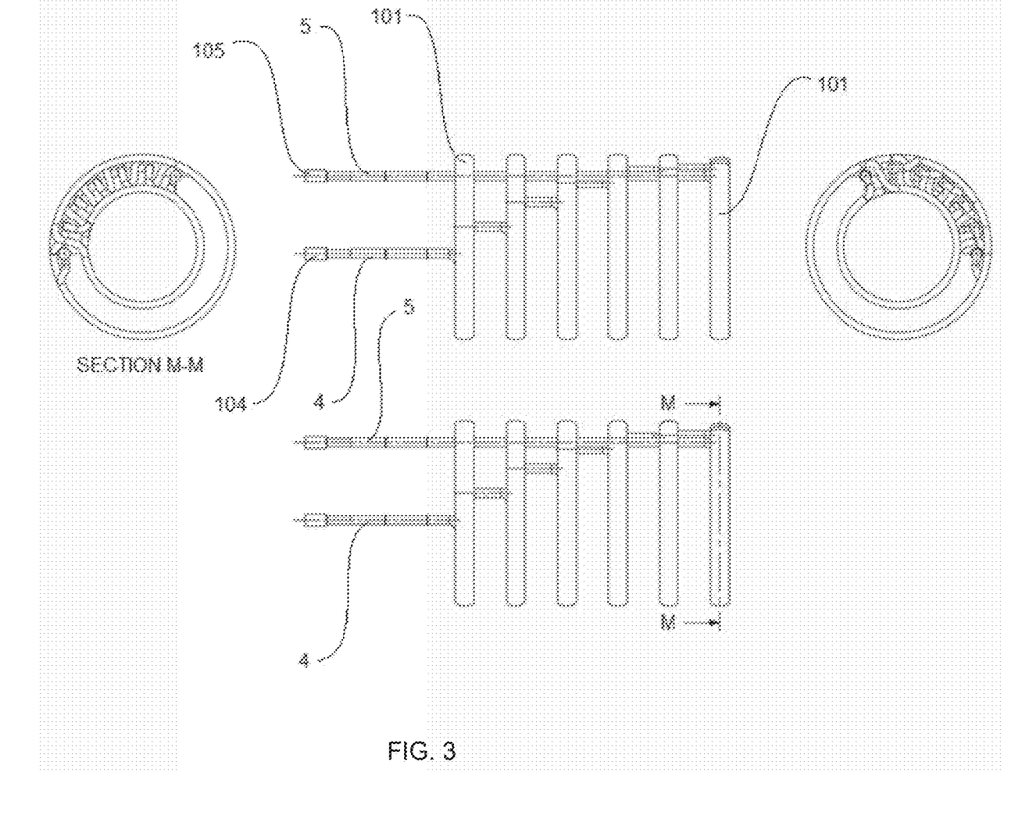
FIG. 3 shows cross section views of the cooling circuit of FIG. 2.

An important aspect is the coolant flow arrangement 3 which is provided to take heat away from each cup. As best shown in FIG. 2 for the configuration with six packing cups, in the present embodiment, the flow arrangement takes the form of six conduits 103a to 103f twice-wound around the central opening 2 of each cup 101 and connected in series to form the configuration shown in FIG. 3. Each conduit 103a to 103f has an input 203a to 203f and an output 303a to 303f port on opposite side of each ring to allow such serial connection. The input and output ports are orientated 90° with respect to the corresponding conduit 103a to 103f with the input port 203a to 203f having a flat junction 403a to 403f to facilitate insertion with the output port of the preceding ring to obtain the structure shown in FIG. 3.

The first conduit 103a, i.e. the one closed to the flange 201, has the output port 303a connected to a first flow path 4 extending longitudinally, i.e. parallel to the axis of the assembly, to reach and output port 104 provided in the flange 201 while the input port 203f of the last conduit 103f, i.e. the one far away from the flange 201, is connected to a second flow path 5 extending longitudinally to bring coolant fluid in through input port 105 provided in the flange 201 as best seen in cross sections shown in FIG. 1.

Figure 5:
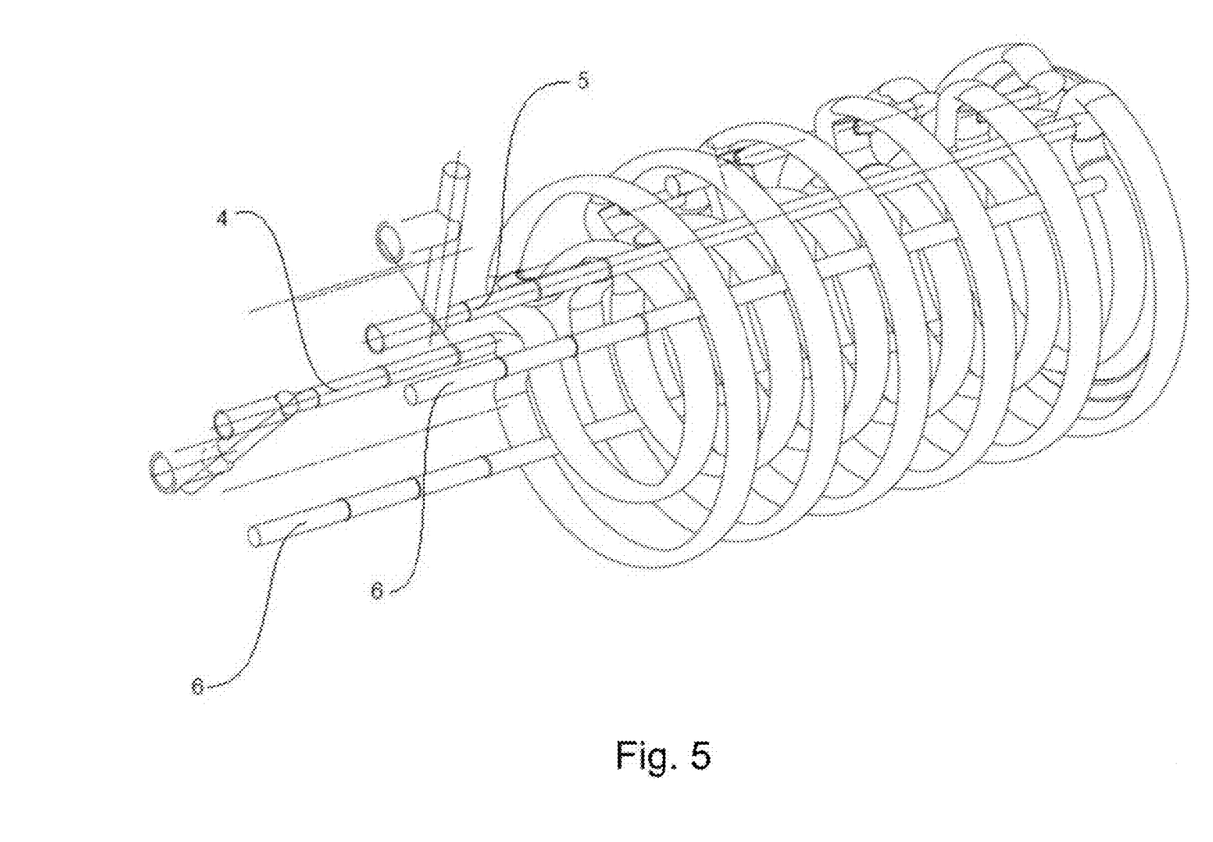
FIG. 5 shows a tridimensional view of the cooling circuit of FIG. 2 with additional thermocouples.

The cooling fluid thus enters the input port 105 in the flange 201, reaches the last conduit 103f of the stack, flows serially through each conduit from the distal to the proximal to the flange 201 and exits at output port 104 as indicated by the arrows in FIG. 2. Thermocouples 6 can be provided, for example between the windings of the cooling circuit 103, to measure the temperature of the assembly in operation as shown in FIG. 5.

Figure 4:
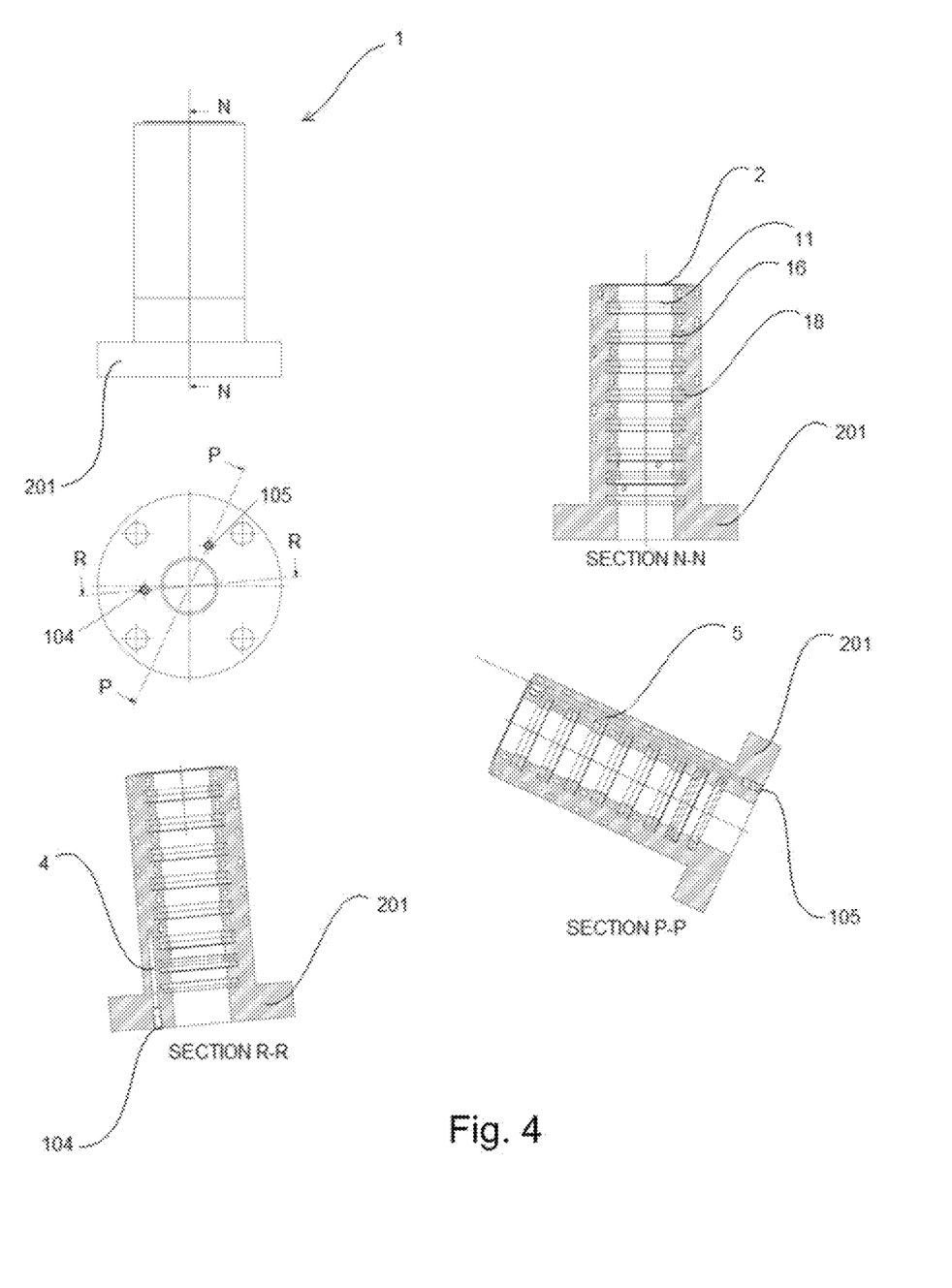
FIG. 4 shows cross section views of a stuffing box according to another embodiment.

In the embodiment shown in FIG. 4, the stuffing box is one piece, i.e. each ring is made integral with the other. This allows to prevent leakage of the fluid circuits (cooling and lubricating) between the rings forming the stack. For the remaining part, the configuration shown in this figure is exactly the same as the one shown in FIG. 1, i.e. a plurality of rings or packing cups 101 stacked on a flange 201, each of the rings or packing cups enclosing a cooling circuit 103*a* to 103*f* comprising an internal 113 and an external 114 circular conduit connected by an intermediate junction 503 to form a double-winding structure around the circular opening 2 as best shown in Section D-D of FIG. 1. The internal and the external circular conduits 113, 114 have terminal ports 203, 303 for connection with one or more cooling circuits of the stack and/or to input/output conduits 4, 5 in fluid communication with the inlet/outlet ports 104, 105 of the housing.

Each ring or packing cup 101 and the corresponding conduits enclosed therein are integral elements constructed in single piece by additive manufacturing process and then stacked together. Alternatively all the rings or packing cups 101 and the conduits forming the cooling circuit are integral elements constructed in single piece by additive manufacturing process to form a single piece stuffing box.

Single piece or multiple piece stacked solutions can be easily implemented thanks to an inventive and useful idea to manufacture the stuffing box using additive manufacturing technology that allows to grow the cooling circuit 3, and in general any kind of flow circuit, such as, for example the lubricating circuit 7, in the form of conduits without having to drill or machine the main material forming the box. Furthermore, thanks to this technology, such conduits can be manufactured with cross section of arbitrary shape, such as elliptic, triangular, square thus allowing to improve thermal exchange without altering the mechanical strength of the components.

The term "additive manufacturing" references technologies that grow three-dimensional objects one layer at a time. Each successive layer bonds to the preceding layer of melted or partially melted material. It is possible to use different substances for layering material, including metal powder, thermoplastics, ceramics, composites, glass and even edibles like chocolate.

Objects are digitally defined by computer-aided-design (CAD) software that is used to create .stl files that essentially "slice" the object into ultra-thin layers. This information guides the path of a nozzle or print head as it precisely deposits material upon the preceding layer. Or, a laser or electron beam selectively melts or partially melts in a bed of powdered material. As materials cool or are cured, they fuse together to form a three-dimensional object.

Although all additive manufacturing (AM) processes feature layer-by-layer fabrication of three-dimensional objects, production techniques vary. In 2010, the American Society for Testing and Materials (ASTM) grouped AM processes into seven categories in a new standard—"ASTM F42—Additive Manufacturing." Every year, members of ASTM Committee F42 meet to consider new or updated standards.

The current categories of additive manufacturing processes are:

Material Extrusion; Directed Energy Deposition; Material Jetting; Binder Jetting; Sheet Lamination; Vat Photopolymerization; Powder Bed Fusion.

Material Extrusion

Material extrusion is one of the most well-known additive manufacturing processes. Spooled polymers are extruded, or drawn through a heated nozzle mounted on a movable arm. The nozzle moves horizontally while the bed moves vertically, allowing the melted material to be built layer after layer. Proper adhesion between layers occurs through precise temperature control or the use of chemical bonding agents.

Directed Energy Deposition

The process of directed energy deposition (DED) is similar to material extrusion, although it can be used with a wider variety of materials, including polymers, ceramics and metals. An electron beam gun or laser mounted on a four- or five-axis arm melts either wire or filament feedstock or powder.

Material Jetting

With material jetting, a print head moves back and forth, much like the head on a 2D inkjet printer. However, it typically moves on x-, y- and z-axes to create 3D objects. Layers harden as they cool or are cured by ultraviolet light.

Binder Jetting

The binder jetting process is similar to material jetting, except that the print head lays down alternate layers of powdered material and a liquid binder.

Sheet Lamination

Laminated object manufacturing (LOM) and ultrasonic additive manufacturing (UAM) are two sheet lamination methods. LOM uses alternate layers of paper and adhesive, while UAM employs thin metal sheets conjoined through ultrasonic welding. LOM excels at creating objects ideal for visual or aesthetic modeling. UAM is a relatively low-temperature, low-energy process used with various metals, including titanium, stainless steel and aluminum.

Vat Polymerization

With vat photopolymerization, an object is created in a vat of a liquid resin photopolymer. A process called photopolymerization cures each microfine resin layer using ultraviolet (UV) light precisely directed by mirrors.

Powder Bed Fusion

Powder Bed Fusion (PBF) technology is used in a variety of AM processes, including direct metal laser sintering (DMLS), selective laser sintering (SLS), selective heat sintering (SHS), electron beam melting (EBM) and direct metal laser melting (DMLM). These systems use lasers, electron beams or thermal print heads to melt or partially melt ultra-fine layers of material in a three-dimensional space. As the process concludes, excess powder is blasted away from the object.

For a comprehensive bibliography on additive manufacturing reference can be made to Wikipedia under the item "3D Printing" to be included herein by reference.

Thanks to additive manufacturing technology, any geometry for the cooling circuit (and optionally of the lubricating circuit) can be obtained, both in single-piece and in ring-stack configurations, thus allowing the design of optimized flow path for any applications of which those represented in the figures are only examples (two-windings serially connected conduits). Single winding or more than two windings serially connected conduits can obviously be manufactured as well as single or multiple winding conduits connected in parallel to input and output flow paths running closely in parallel or mixed solutions where parts of the conduits are connected in serial and part in parallel to obtain a very flexible and powerful solution.

According to an aspect, there is a method for manufacturing of a stuffing box, the method comprising growing through additive manufacturing processing:

a plurality of packing cups 101 having a central opening 2 for insertion of a movable machinery shaft therein;

one or more cooling conduits 103 around the central opening 2 and enclosed in the packing cups 101, said conduits surrounding a majority peripheral portion of said central opening 2 to form a path 3 for the flow of a fluid coolant substantially completely around said circular opening 2 between a fluid inlet port 105 and a fluid outlet port 104.

The method may advantageously comprise also growing one or more lubricating conduits 7 running along the central opening 2 to form a path for the flow of a lubricating fluid between a lubricating inlet 107 and outlet 207 port.

According to an embodiment, the method comprises growing a plurality of separate packing cups 101 with related cooling conduits 103a to 103f having intermediate inlet/outlet ports 203, 303 and stacking such packing cups 101 onto a flange 201 so as to connect serially the cooling conduits of consecutive rings to form a cooling circuit substantially surrounding the central opening 2. The cooling circuit can also be grown to obtain parallel connections or mixed serial and parallel structures.

According to a further embodiment, the method comprises growing the packing cups 101 and the conduits of the cooling circuit and/or the lubricating circuit integrally to form a single piece stuffing box.

Advantageously, the method may comprise growing conduits of the cooling circuit 3 and/or the lubricating circuit 7 with cross sections of arbitrary shape such as elliptic, triangular, square or the like to improve thermal exchange without altering the mechanical strength of the components.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

What is claimed is:

1. A method for manufacturing a stuffing box, the method comprising:
   using additive manufacturing to grow,
      packing cups having a central opening configured to receive a movable machinery shaft therein; and
      cooling conduits around the central opening, the cooling conduits forming a double-winding structure surrounding a majority peripheral portion of the central opening; and
   connecting the cooling conduits to a fluid inlet port and a fluid outlet port to form a path for the flow of a fluid coolant around the central opening from the fluid inlet port to the fluid outlet port.

2. The method of claim 1, wherein the cooling conduits are enclosed in the packing cups.

3. The method of claim 1, further comprising:
   using additive manufacturing to grow, lubricating conduits along the central opening.

4. The method of claim 1, further comprising:
   using additive manufacturing to grow, lubricating conduits along the central opening; and
   connecting the lubricating conduits to a lubricating inlet port and a lubricating outlet port to form a path for the flow of a lubricating fluid between the lubricating inlet port and the lubricating outlet port.

5. The method of claim 1, further comprising:
   stacking the packing cups on a flange.

6. The method of claim 1, further comprising:
   using additive manufacturing to grow the packing cups separately from one another.

7. The method of claim 1, further comprising:
   using additive manufacturing to grow the packing cups separately from one another, the cooling conduits having intermediate inlet/outlet ports.

8. The method of claim 1, further comprising:
   using additive manufacturing to grow the packing cups separately from one another; and
   stacking the packing cups onto a flange.

9. The method of claim 1, further comprising:
   using additive manufacturing to grow the packing cups separately, the cooling conduits having intermediate inlet/outlet ports; and
   stacking the packing cups onto a flange so as to connect the cooling conduits of adjacent packing cups to form a cooling circuit substantially surrounding the central opening.

10. The method of claim 1, further comprising:
    using additive manufacturing to grow, the packing cups and the conduits of the cooling circuit integrally to form a single piece stuffing box.

11. The method of claim 1, further comprising:
    using additive manufacturing to grow, the packing cups and the lubricating circuit integrally to form a single piece stuffing box.

12. The method of claim 1, further comprising:
    using additive manufacturing to grow, conduits of the cooling circuit with cross sections of arbitrary shape.

13. The method of claim 12, further comprising:
    using additive manufacturing to grow, conduits of the lubricating circuit with an elliptic cross section.

14. The method of claim 1, further comprising:
    using additive manufacturing to grow, conduits of the lubricating circuit with cross sections of arbitrary shape.

15. The method of claim 14, further comprising:
    using additive manufacturing to grow, conduits of the lubricating circuit with an elliptic cross section.

16. A machine, comprising:
    a packing box made in accordance with claim 1,
    wherein the moveable machinery is a shaft.

17. The method of claim 1, wherein the double-winding structure comprises an interior circuit and an exterior circuit.

18. The method of claim 1, wherein the double-winding structure comprises an interior circuit and an exterior circuit formed concentrically with one another.

19. The method of claim 1, further comprising:
    integrating a temperature sensor between windings of the double-winding structure.

20. The method of claim 1, further comprising:
    integrating a thermocouple between windings of the double-winding structure.

* * * * *